United States Patent
Cheriton et al.

(10) Patent No.: US 6,675,200 B1
(45) Date of Patent: Jan. 6, 2004

(54) PROTOCOL-INDEPENDENT SUPPORT OF REMOTE DMA

(75) Inventors: David R. Cheriton, Palo Alto, CA (US); Constantine P. Sapuntzakis, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/569,850

(22) Filed: May 10, 2000

(51) Int. Cl.$^7$ .................. G06F 15/167; G06F 15/16; G06F 13/28; H04J 3/00
(52) U.S. Cl. .................. 709/212; 709/232; 370/464; 370/471; 370/472; 370/476; 710/22
(58) Field of Search .................. 370/464, 471, 370/472, 476; 710/22; 709/232, 212

(56) References Cited

U.S. PATENT DOCUMENTS

| | | | | |
|---|---|---|---|---|
| 5,752,078 A | * | 5/1998 | Delp et al. ................. | 710/7 |
| 5,940,404 A | * | 8/1999 | Delp et al. ................. | 370/465 |
| 5,978,865 A | * | 11/1999 | Hansen et al. ............. | 710/22 |
| 5,991,797 A | * | 11/1999 | Futral et al. .............. | 709/216 |
| 6,014,717 A | * | 1/2000 | Bezzant et al. ............ | 710/22 |
| 6,061,748 A | * | 5/2000 | Taglione et al. ........... | 710/22 |
| 6,226,680 B1 | * | 5/2001 | Boucher et al. ........... | 709/230 |
| 6,243,778 B1 | * | 6/2001 | Fung et al. ................ | 710/113 |
| 6,457,072 B1 | * | 9/2002 | Fairman .................... | 710/22 |
| 6,463,059 B1 | * | 10/2002 | Movshovich et al. ...... | 370/389 |
| 6,493,343 B1 | * | 12/2002 | Garcia et al. .............. | 370/394 |
| 6,549,959 B1 | * | 4/2003 | Yates et al. ................ | 710/22 |

* cited by examiner

Primary Examiner—Krisna Lim
(74) Attorney, Agent, or Firm—Campbell Stephenson Ascolese LLP (57) ABSTRACT

A remote DMA (RDMA) shim protocol laid atop an existing network data transfer protocol but logically underneath higher level disk and file access protocols specifies the portion of a data packet to be transferred directly into a separate area of memory such as an application layer memory buffer. This RDMA protocol identifies the area of memory into which the data should be delivered, a data ID, data start, data length or end, and flag bits. Option fields added to (or already present in) the transport protocol describe the RDMA transfer. On reception of a packet specifying RDMA, the receiving device delivers the data directly into the correct memory location using the RDMA description data. In some embodiments of the present invention, the RDMA shim protocol is implemented with TCP options specifically introduced to enable RDMA and thus reduce the overhead of transferring and receiving data with a TCP-based protocol such as NFS or HTTP. Use of a TCP option technique enables the construction of simple hardware accelerators to copy data directly from the incoming packet into application memory buffers, thus avoiding expensive copies within the protocol stack. Alternatively, software techniques may be used to perform direct copying to the application memory buffer. The RDMA protocol options thus enable the protocol stack to decrease the number of copies required to perform data transfers, thus lowering overhead costs.

20 Claims, 4 Drawing Sheets

Microfiche Appendix Included
(5 Microfiche, 270 Pages)

| Byte | 0 | 1 | 2 | 3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| 0 | 25 | Length 210 | A\|U RDMA ID (RID) 220 | RDMA ID 220 |
| 4 | | | | |
| 8 | Buffer Offset 260 | | | |
| 12 | Data Offset 230 | | | Data Length 240 |
| 16 | Total RDMA Length 250 | | | |

| Byte | 0 | 1 | 2 | 3 |
|---|---|---|---|---|
| | 7 6 5 4 3 2 1 0 | 7 6 5 4 3 2 1 0 | 7 6 5 4 3 2 1 0 | 7 6 5 4 3 2 1 0 |
| 0 | 25 | Length 210 | A\|U RDMA ID (RID) 220 | RDMA ID 220 |
| 4 | | | | |
| 8 | Buffer Offset (B) 310 | | | |
| 12 | Starting Sequence (Start) 320 | | | |
| 16 | Ending Sequence (End) 330 | | | |

PROTOCOL-INDEPENDENT SUPPORT OF REMOTE DMA

REFERENCE TO MICROFICHE APPENDIX

Included by reference herein, in their entirety and for all purposes, are the following microfiche appendices:

Appendix A Information Technology—SCSI Architecture Model—2 (SAM-2) (2 Sheets Microfiche, 99 Frames)

Appendix B SCSI/TCP (SCSI Over TCP) (1 Sheet Microfiche, 48 Frames)

Appendix C A Common Internet File System (CIFS/1.0) Protocol—Preliminary Draft (2 Sheets Microfiche, 123 frames)

BACKGROUND OF THE INVENTION

1. Field of the Invention

The present invention relates to data transfer techniques, in particular DMA techniques for use in internetworking.

2. Description of the Related Art

Direct memory access (DMA) is a well-known method of moving data between a disk or other storage system and memory by direct transfer without first copying it into processor memory.

Various types of input/output (I/O) access have been provided over computer networks for many years. These systems, which typically use technologies such as disk file or tape systems, have suffered from the overhead of the network protocol processing needed to read and copy the data from the source system, re-format the copy, and transmit the reformatted data to the receiving system. At a minimum, prior data transfers across networks have typically required copying the data in order to move it to another location after reception.

As networks move to ever-higher data rates in the megabits to gigabits per second (Mbps, Gbps) and beyond, the speed of the networks has made the centralization of storage in remote sites more feasible. However, such storage centralization and the necessary data transfer requirements have exposed the extra memory copies required by conventional network communication protocol implementations as a significant and unacceptable cost.

Networked storage data transfers are highly desired by users of storage systems. Utilizing current networking protocols in these data transfers, however, incurs high overhead costs because the endpoint in the network transfer is forced to make an extra copy of some or all of the data. As the number of blocks received per second increases, the amount of copying delay and thus overhead required to handle each block increases dramatically because each copy in a chain of copies is increased in size.

To date, the response to the problem of unacceptable overhead requirements in network remote DMA (RDMA) has been to invent entirely new protocol architectures. The logic behind these new protocol architectures, which include Fibre Channel, NGIO, Future I/O, and System I/O, and InfiniBand, has been to re-engineer the entire communications protocol to focus specifically on the RDMA task. These new architectures have also been justified by citing unspecified "performance issues" with existing protocol suites and, in particular, the TCP/IP protocol suite.

What is needed is a remote direct memory access technique that leverages from existing protocol architectures in a way that greatly reduces the amount of data copying needed to transfer large blocks of data across the network. Such an RDMA technique must also avoid (or at least minimize) modifications to the installed network hardware and software base.

SUMMARY

The present invention is a shim protocol laid atop an existing network data transfer protocols, in particular TCP, but logically underneath the higher level disk and file access protocols. The shim protocol specifies the portion of the data packet to be transferred to a separate area of memory, such as an application layer buffer. The protocol also identifies the area of memory into which the data should be delivered, a data ID, data start, data length or end, and flag bits. While this invention can be embodied in an adaptation of the well-known TCP protocol, it is not necessarily limited to implementation within the TCP protocol, but may be used in conjunction with other protocols and variations on conventional protocols.

In one embodiment of the present invention, a network interface device implements a transport protocol including the RDMA shim protocol. As will be made apparent below, the shim protocol of the present invention can be implemented using option fields added to (or already present in) an existing transport protocol. Drivers within the device transmit packets containing an RDMA description according to the high level or overlying protocol described at the shim layer. On reception of a packet specifying RDMA, the receiving device is able to deliver the data directly into the correct memory area or buffer as is commonly performed by conventional, local DMA operations.

In some embodiments of the present invention, the RDMA shim protocol is implemented with TCP options specifically introduced to enable RDMA and thus reduce the overhead of transferring and receiving data with a TCP-based protocol such as NFS or HTTP. Use of a TCP option technique enables the construction of simple hardware accelerators to copy data directly from the incoming packet into application memory buffers thus avoiding expensive copies within the protocol stack. Alternatively, software techniques may be used to perform direct copying into the application memory space, for instance a copy into an application layer buffer.

BRIEF DESCRIPTION OF THE DRAWINGS

The present disclosure may be better understood and its numerous features and advantages made apparent to those skilled in the art by referencing the accompanying drawings.

The use of the same reference symbols in different drawings indicates similar or identical items.

DETAILED DESCRIPTION

Introduction

As currently known in the art, remote DMA (RDMA) transactions between network hosts using TCP protocols requires a great deal of additional work in both the client and server host processors, especially at network communication speeds of a megabit per second (Mbps) or higher. To see where this overhead comes from, it is instructive to look at an example.

Consider the problem of an 8-kilobyte (KB) network file system (NFS) transfer coming from the Internet and destined for an application memory. As the Internet's maximum transmission unit (MTU) is around 1,500 bytes, the sender must send at least six packets across the Internet link.

At the receiving system, the six packets arrive at the network interface. For each of the six packets, the network interface copies the entire packet into the receiving host system memory and notifies the host software of the arrival of the packets. The host software then does IP and TCP processing.

Next, the NFS parses the data in the TCP receive buffer to find the file pages. The NFS then copies the file pages into a buffer cache. Once in the buffer cache, the host operating system maps the pages into the application's address space (i.e., application layer memory).

These conventional memory-to-memory (or buffer to buffer) copies consume valuable memory bandwidth in each receiving host. To improve performance, it is necessary to reduce the number of copies. One way to do this is to have the network interface write the file data directly into its final location, e.g., the application buffer or cache, the very first time. This requires that the network interface recognize file data in incoming packets. For NFS and HTTP, the problem of recognizing file data involves parsing the protocol headers, which can be complicated and does not lend itself to a simple hardware realization.

In order to circumvent complex protocol header parsing, a new TCP option, refined to herein as the "RDMA option," has been devised. To use the RDMA option, the sender places option bytes in the header of each TCP segment containing RDMA data. The RDMA option bytes describe the location of the RDMA data in the TCP payload to the receiver, which allows the receiving system to load the RDMA data directly to application memory without making intermediate copies.

The RDMA option also contains an RDMA identifier (RID). The RID allows multiple outstanding RDMA transfers on a single TCP connection by uniquely tagging the RDMAs. In some embodiments of the present invention, the layout of the RID depends on the specific higher layer protocol used in the link, e.g., NFS, HTTP, CIFS, or SCSI.

It is important to note that the RDMA option is simply an annotation or byte code within the TCP header and requires no modifications to the overlying or underlying protocols used along with TCP.

RDMA Option Definition

Figure 1:
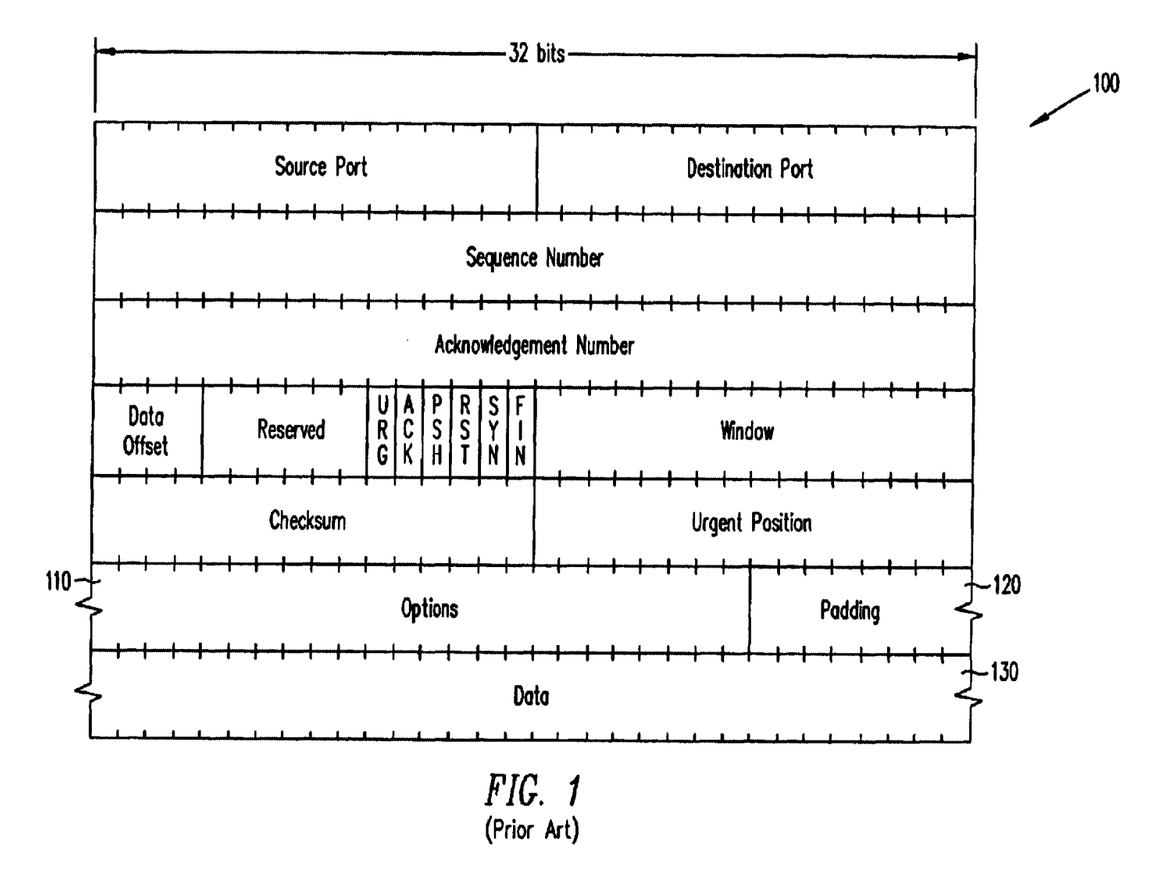
FIG. 1 is a bitmap representing fields within the prior art TCP header.

FIG. 1 shows a bitmap of the TCP header as known in the prior art. TCP headers are described in further detail in Karanjit S. Siyan, *Inside TCP/IP*, 3d ed., New Writers Publishing 1997, Chapter 11, which is incorporated herein by reference in its entirety. TCP header 100 includes within it a field for options 110 and padding 120 immediately preceding the data payload field 130.

Figure 2:
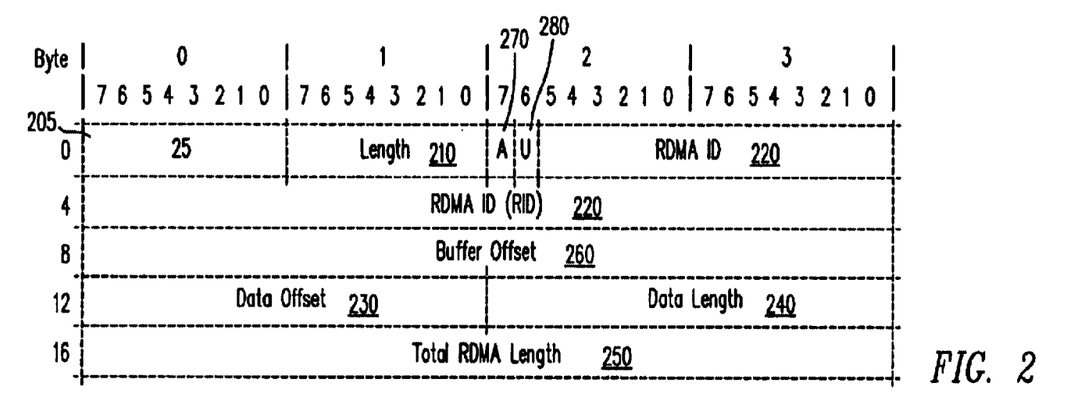
FIG. 2 is a bitmap of the fields within the RDMA option, according to one embodiment of the present invention.

The RDMA option field consists of a series of either two, four, sixteen, or twenty bytes organized as shown in FIG. 2.

The option field begins with a single byte defining the option "kind" 205, a TCP option designator known and understood in the networking art. Second byte 210 shows the length of the RDMA option. This byte is followed by additional bytes as depicted in FIG. 2; each will be described in turn below.

RID 220

All segments in a single RDMA transfer carry the same 46 bit RDMA ID (RID) 220. RID 220 is an application-level identifier that the receiving system can use to associate or map the transfer to an application buffer. The exact value of the RID depends on the overlying protocol (e.g., NFS, HTTP). Exemplar RID formats for several popular protocols are discussed further below. RID 220 is stored in network byte order: bits 40 through 45 are placed in bits 0 through 5 of byte 2. Bits 0 through 7 of the RID are placed in bits 0 through 7 of byte 7.

Data Offset 230

The data offset specifies the number of bytes from the beginning of the TCP payload to the RDMA transfer data. The data offset must not exceed the length of the TCP payload.

Data Length 240

The data length specifies the number of bytes of RDMA transfer data in this segment, starting at data offset 230. The data length must not cause the option to describe bytes past the end of the TCP segment. A data length of 0 is valid.

Total RDMA Length 250

The total RDMA length is the number of bytes that will be transferred using this RID.

If the sender does not know the length of the RDMA when the segment is sent, the sender should send a sixteen byte version of this option that leaves total RDMA length field 250 off.

The total RDMA length, when present, must be the same for all segments in the RDMA transfer. A total RDMA length of 0 is valid.

Buffer Offset 260

Each RDMA transfer is presumed destined for a distinct buffer in the receiver. Buffer offset field 260 specifies the starting point in that buffer to begin writing data. The receiver writes the RDMA data demarcated by the data offset and data length fields, beginning at receiver buffer offset location 260. Note that the term "buffer" in this context is a logical construct only; the receive buffer is actually in the receiving application's address space.

Message Aligned (A) Bit 270

The message aligned bit, when 1, indicates that byte 0 of the TCP payload corresponds to the start of a new application-layer RDMA message. Message aligned (A) bit 270 is bit 7 of byte 2 in one embodiment of the present invention.

The four-byte version of the RDMA option may be sent if the sender wishes to only communicate a message aligned state.

Unsolicited (U) Bit 280

In NFS and other prior art PC-based protocols, transfers from the server to the client (e.g., client reads) occur in response to an explicit request by the client. This explicit request indicates that the client has an allocated buffer waiting for the data from the transfer, or at least has had the opportunity to create an allocated buffer. The client typically uses the explicit request to communicate an identifier to the server that the server places in the response. In some embodiments of the present invention, that identifier is embedded in the RID to associate the requested (solicited) data with the allocated client buffer.

However, transfers from the client to the server (e.g., client writes) often occur on the request, without any receiver buffer pre-allocation. There is usually no opportunity for a client to obtain any kind of identifier for the server's application buffer. Indeed, the server may not even have an application buffer allocated for the client request. To indicate the special situation where a client is requesting and transmitting a write, the unsolicited bit 280 is used. The unsolicited bit is bit 6 of byte 2 in one embodiment of the present invention. The sender should set the unsolicited bit 280 to 1 if the receiver does not expect the RID.

Other Constraints

The RDMA option must appear on every segment containing data that is part of an RDMA transfer and the sender must align the RDMA option on a four-octet boundary relative to the TCP header.

For the purposes of TCP option negotiation, the length field 210 may be set to 2 to prevent any accidental RDMA transfers.

In general, TCP segments must conform to the rules laid out above when all RDMA options but the first in the segment are stripped. This is because some implementations of the present invention may only look at the first RDMA option in a segment. Even though some implementations may not look at all RDMA options, it is still important that the RDMA option appear on every segment that contains data that is part of a particular RDMA transfer.

TCP Stream Example

Figure 4:
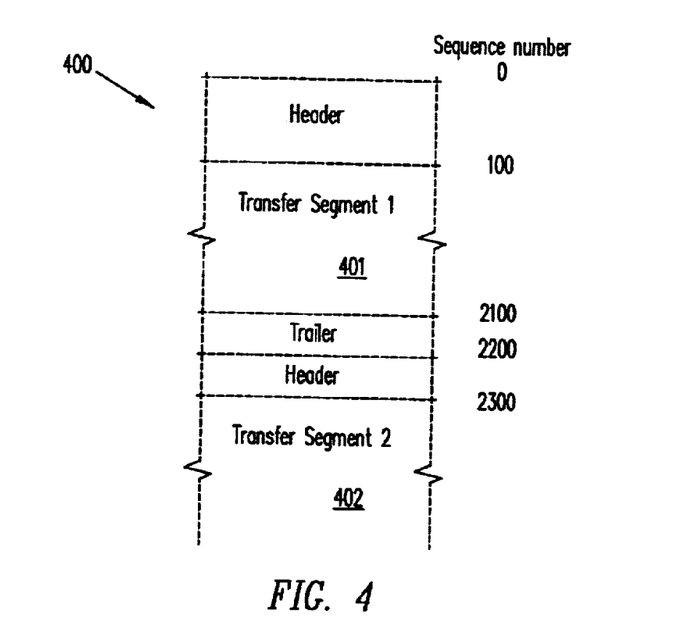
FIG. 4 is a high level schematic of a TCP stream segmentation process, according to one embodiment of the present invention.

FIG. 4 shows a graphic representation of a TCP stream representing a single RDMA transfer that occupies two contiguous segments of the TCP stream, here numbered segments 401 and 402. Table 1 illustrates how each segment of the TCP stream is turned into six TCP segments each having the RDMA option bytes properly set. The TCP maximum segment size (MSS) for this stream is 1000 bytes, and the sequence number comes from the TCP header (not shown).

TABLE 1

| Segment Number | Sequence Number | Buffer Offset | Data Offset | Data Length |
| --- | --- | --- | --- | --- |
| 1 | 0 | 0 | 100 | 900 |
| 2 | 1000 | 900 | 0 | 1000 |
| 3 | 2000 | 1900 | 0 | 100 |
| 4 | 2200 | 2000 | 100 | 900 |
| 5 | 3200 | 2900 | 0 | 1000 |
| 6 | 4200 | 3900 | 0 | 100 |

It will be noted that Segment No. 3 is only 200 bytes and consists of data and 100 bytes of trailer. If available to the TCP stack at the time of transmission, the TCP stack could send out the next header as part of the segment. Table 2 shows such a segmentation.

TABLE 2

| Segment Number | Sequence Number | Buffer Offset | Data Offset | Data Length |
| --- | --- | --- | --- | --- |
| 1 | 0 | 0 | 100 | 900 |
| 2 | 1000 | 900 | 0 | 1000 |
| 3 | 2000 | 1900 | 0 | 100 |
| 4 | 2300 | 2000 | 0 | 1000 |
| 5 | 3300 | 3000 | 0 | 1000 |

The failure to put application headers at the front of a TCP segment may cause decreased performance with some receiving systems.

In either segmentation, Segment 3 cannot include any of the data in Segment 4 since the RDMA option can only describe one transfer per packet. Thus, Segment 3 will always be less than the MSS, even if the TCP stack has more data to send.

RID Formats

NFS

Figure 5A:
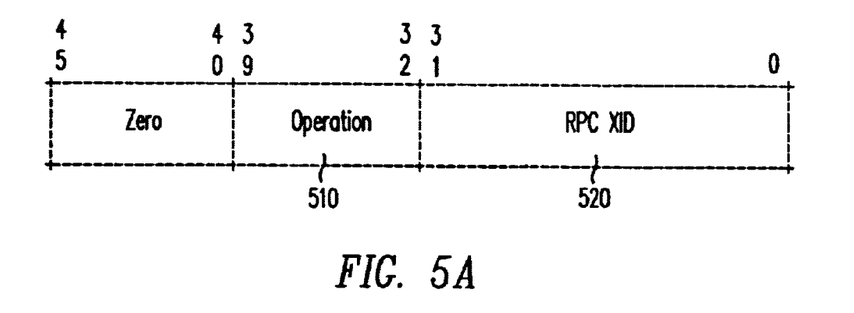
FIGS. 5A, 5B, and 5C show the RDMA identifier (RID) format for several representative TCP protocols, according to one embodiment of the present invention.

In NFS, file pages are transferred using the NFS READ and WRITE remote procedure calls (RPCs). When issuing a READ, the NFS client presumably has an application buffer, e.g., a block cache buffer waiting to absorb the transferred data. When receiving a WRITE, the NFS server may not have a waiting application buffer to absorb the data. The format of RID 220 for the NFS protocol is as shown in FIG. 5A. Bits 45 through 40 must be set to zero by the sender and received as zeros by the receiver. Bits 39 through 32 contain an operation index 510. Because NFS version 4 allows multiple read and write "operations" per RPC, these operations must be distinguished from each other because all operations share the same transaction ID (XID) 520. Operation index 510 performs this function, as it is set to zero for the first operation, one for the second, and so forth.

Note that operation index 510 is independent of whether the operation results in an RDMA. If only the third operation in an RPC results in an RDMA, then RID 220 for that RDMA will have a 2 in the operation index field. In situations using NFS versions 2 and 3, the operation index must be set to zero, as those versions of NFS do not allow multiple READ and WRITE operations per RPC. Finally, bits 31 through zero of the RID for the NFS protocol contain a 32-bit transaction ID 520.

For the pages sent in response to NFS READ requests, the server must not set unsolicited bit 280 to 1 as these transmissions are solicited. If the READ RPC fails and no data is returned, the server should indicate a zero length RDMA transfer by setting data length 240 in the RDMA option to zero.

In the case of NFS WRITE calls, the client should set unsolicited bit 280 to 1, since the server is not expecting the WRITE.

The message aligned bit 270, when used on an NFS connection, indicates the start of an Open Network Computing (ONC) RPC message at byte zero of a payload.

The start of an ONC RPC message is the 4-byte length field that is defined for the tunneling of RPC over TCP.

HTTP

Figure 5B:
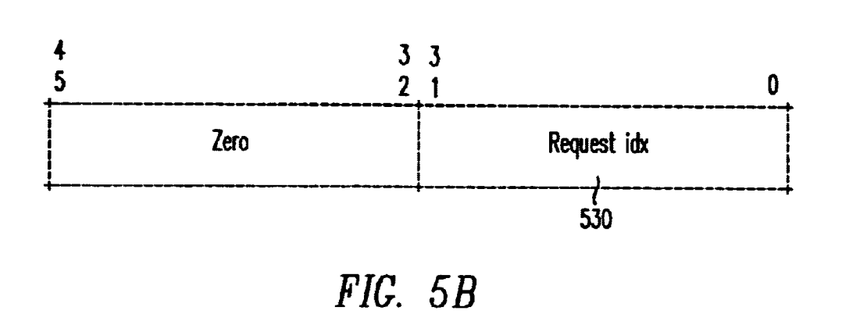

FIG. 5B shows the RID format for an HTTP version 1.1 connection. Bits 45 through 32 contain zeros and 31 through zero contain a request index 530. In an HTTP 1.1 connection, the server sends back responses in the order in which it received the request. Thus, the request index 530, where the first request is index zero, is sufficient to disambiguate the RDMAs. In the case of an HTTP GET request, unsolicited bit 280 should be set to zero. Note that the HTTP server may not know the length of the response, so clients should be prepared to receive a sixteen byte RDMA option which lacks the RDMA total length 250. In the case of POST or PUT requests, the client sends data to the server. In these cases, unsolicited bit 280 should be set to 1.

CIFS

Figure 5C:
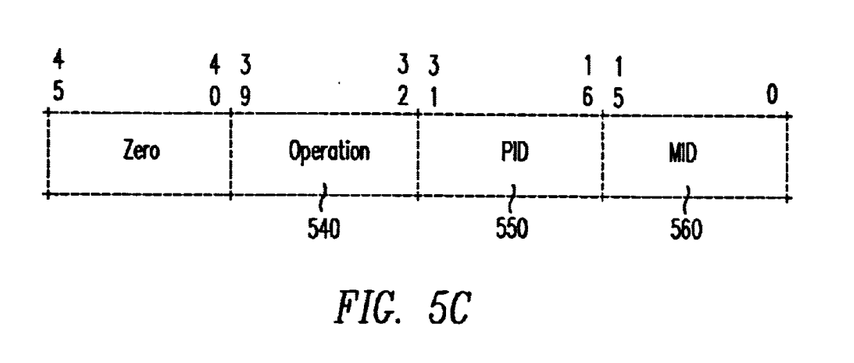

FIG. 5C shows the RDMA option format used by the Common Internet File system (CIFS). CIFS is based on an RPC system known as Server Message Block (SMB). In SMB, a request is uniquely identified by a 64-bit quantity that includes four 16-bit fields: Tree ID, User ID, Process ID (PID), and Multiplex ID (MID). There is insufficient room in the RID to include all four fields. However, the PID and MID originate from the client and are un-interpreted by the server. The client can therefore assign PIDs and MIDs so as to disambiguate concurrent requests. Thus, a CIFS client using the RDMA option must ensure that two concurrent SMB requests do not share the same PID and MID fields. Accordingly, the CIFS RID format as shown in FIG. 5C consists of operation index 540, PID 550, and MID 560 fields, in addition to the leading zeros.

The operation index 540, bits 39 through 32 of the CIFS RID, supports compound requests that can result in multiple transfers per SMB. Operation index 540 corresponds to the index of the operation in the SMB that caused the RDMA. The first operation is given index zero, the second index one, and so on. Operations are logically assigned indices whether or not they cause an RDMA. Bits 40 through 45 of the CIFS RID must be set to zero by the sender and received as zeros by the receiver.

For CIFS operations that return data from the server, unsolicited bit 280 should be set to zero. For CIFS operations that send data from the client, unsolicited bit 280 should be set to one.

Message aligned bit 270, when used on a CIFS connection, indicates the start of a NetBIOS message at byte zero of a payload. The start of a NetBIOS message is the four-byte length field that is defined for the tunneling of NetBIOS over TCP, as typically used in the art.

SCSI

The SCSI architecture model defined in "SCSI-3 Architecture Model" (ANSI X3.270:1996) and "SCSI Architecture Model-2 Draft" (ANSI T101157-D) describes the requirement for SCSI transport protocols. SCSI over TCP is one such transport and is further described in J. Satran, et al., "SCSI/TCP," (hereinafter Satran). Satran describes a RID structure for SCSI that is useable in (but not essential to) an embodiment of the present invention.

ANSI X3270:1996 is incorporated herein by reference in its entirety. (ANSI Standards are available from ANSI, 11 W. $42^{nd}$ St., $13^{th}$ Floor, New York, N.Y., 10036. ANSI T10-1157-D, reproduced in Appendix A, is incorporated herein by reference in its entirety. Satran, reproduced in Appendix B, is incorporated herein by reference in its entirety.

Relevant References

CIFS is further described in Leach, P., "A Common Internet File System (CIFS/1.0) Protocol Preliminary Draft," December 1997. This reference is reproduced in Appendix C and incorporated herein by reference in its entirety.

HTTP is further described in Gettys, J., et al., "Hypertext Transfer Protocol-HTTP/1.1," RFC 2616, June 1999, incorporated herein by reference in its entirety.

NFS is further described in Callaghan, B., "NFS Version 3 Protocol Specification," RFC 1813, June 1995, incorporated herein by reference in its entirety.

RPCs are further described in Srinivasan, R., "RPC: Remote Procedure Call Protocol Specification Version 2," RFC 1831, August 1995, incorporated herein by reference in its entirety.

TCP is further described in J. Postel, "Transmission Control Protocol-DARPA Internet Program Protocol Specification," RFC 793, September 1981, incorporated herein by reference in its entirety.

Alternate Embodiments

In an alternate embodiment of the RDMA option byte codes described above, referring now to FIG. 3, a slightly different RDMA bitmap may be implemented to provide an option structure that is constant across all packets and segments within a single RDMA transfer. RDMA packet 300, according to this embodiment, consists of a TCP option kind 205, length value 210, aligned bit 270, unsolicited bit 280, and RID 220. However, buffer offset (B) 310 is used in combination with sequence START 320 and sequence END 330 (all unsigned 32 bit integers) to place data correctly in the destination (application) memory associated with RID 220.

Figure 3:
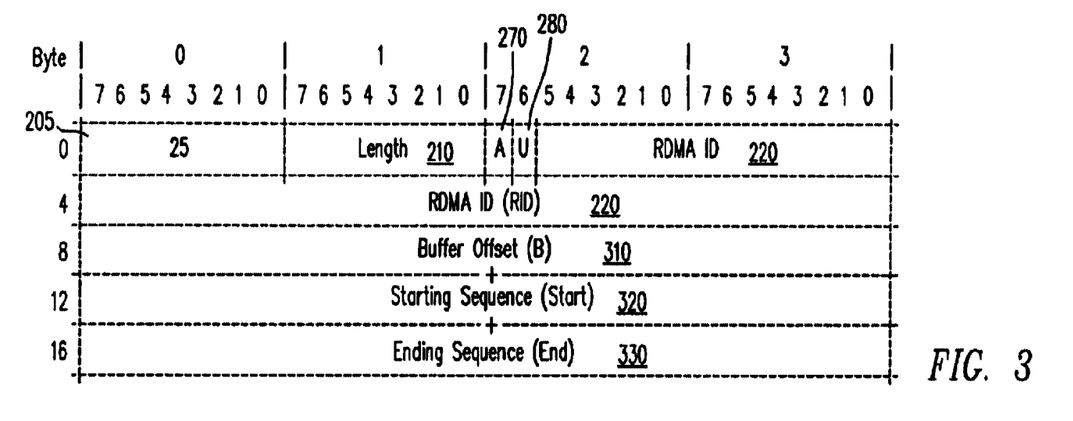
FIG. 3 is a bitmap of the fields within the RDMA option, according to an alternate embodiment of the present invention.

A byte at sequence number N in the TCP stream, where N is greater than or equal to START (N being less than END) is placed at offset B+(N−START) in the destination memory. Values of START 320 that are greater than END 330 are invalid. All other bytes and flags have the same functions as described above with respect to FIG. 2.

The advantage of the alternate RDMA option structure described in FIG. 3 is that the RDMA option byte codes do not need to be recalculated for each transmit sequence (or segment) as in the baseline embodiment of FIG. 2. Here, sequence START 320 and sequence END 330 values remain fixed, whereas in the embodiment of FIG. 2 data offset 230 and total RDMA length 250 can vary from segment to segment.

Figure 6:
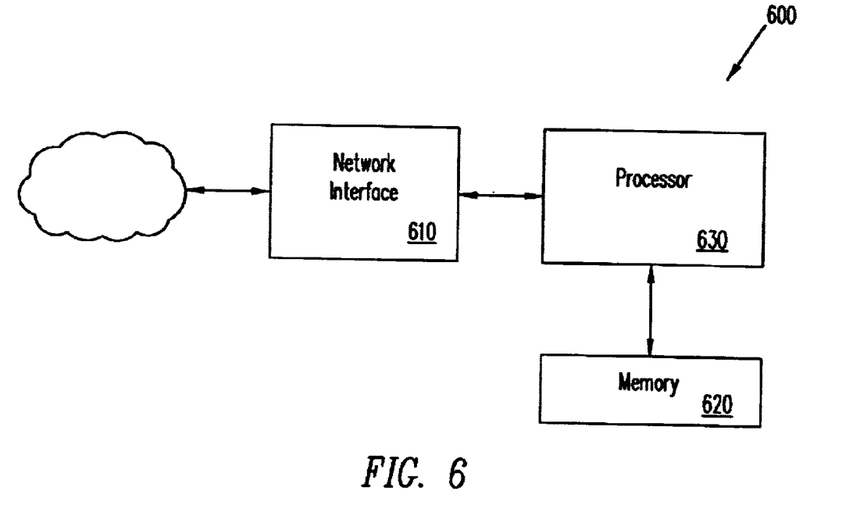
FIG. 6 is a high-level block diagram of a computer system according to one embodiment of the present invention.

FIG. 6 shows an alternate embodiment of the present invention utilizing (at a minimum) a network interface 610, a memory 620, and a processor 630. Elements 610, 620, and 630 are configured to receive a packet formatted with the appropriate RDMA byte codes according to the RDMA shim (or "intermediate") protocol discussed above. Processor 630 then manipulates (processes) the packet using the RDMA byte codes to identify the data payload within the packet and store that payload directly into memory 620.

The order in which the steps of the present method are performed is purely illustrative in nature. In fact, these steps can be performed in any order or in parallel, unless otherwise indicated by the present disclosure.

The method of the present invention may be performed in hardware, software, or any combination thereof, as those terms are currently known in the art. In particular, the present method may be carried out by software, firmware, or microcode operating on a computer or computers of any type. Additionally, software embodying the present invention may comprise computer instructions in any form (e.g., source code, object code, interpreted code, etc.) stored in any computer-readable medium (e.g., ROM, RAM, magnetic media, punched tape or card, compact disc (CD) in any form, DVD, etc.). Furthermore, such software may also be in the form of a computer data signal embodied in a carrier wave, such as that found within the well-known Web pages transferred among computers connected to the Internet. Accordingly, the present invention is not limited to any particular platform, unless specifically stated otherwise in the present disclosure.

While particular embodiments of the present invention have been shown and described, it will be apparent to those skilled in the art that changes and modifications may be made without departing from this invention in its broader aspect and, therefore, the appended claims are to encompass within their scope all such changes and modifications as fall within the true spirit of this invention.

We claim:

1. A method of facilitating remote direct memory access (RDMA) in a data communications system comprising the steps of:

receiving a packet according to an intermediate protocol layer definition, wherein said intermediate protocol layer definition provides for a plurality of RDMA byte codes in the packet header, and wherein the packet header comprises one or more RDMA byte codes; and processing said packet based at least in part on said RDMA byte codes, said processing further comprising:
reading said byte codes to identify an RDMA data payload within said packet; and
storing said RDMA data payload in a memory without copying said RDMA payload.

2. The method of claim 1, wherein:
said byte codes comprise
an RDMA identifier;
an RDMA, data offset value; and
an RDMA data length value; and
said memory is identified by said RDMA identifier; and wherein said RDMA data is written to said memory using said data offset value and said data length value.

3. The method of claim 1, wherein:
said byte codes comprise:
an RDMA identifier;
a buffer offset value;
a sequence start value; and
a sequence end value; and
said memory is identified by said RDMA identifier; and wherein said RDMA data is written to said memory starting at an address designated by said buffer offset value and said sequence start value.

4. A method of facilitating remote direct memory access (RDMA) in a data communications system comprising the steps of:
receiving a packet according to an adapted transport layer protocol definition, wherein said adapted transport layer protocol definition provides for a plurality of RDMA byte codes in the packet header, and wherein the packet header comprises one or more RDMA byte codes; and
processing said packet based at least in part on said RDMA byte codes, said processing further comprising:
reading said byte codes to identify an RDMA data payload within said packet; and
storing said RDMA data payload in a memory without copying said RDMA payload.

5. The method of claim 4, wherein said adapted transport layer protocol definition is based on the Transmission Control Protocol (TCP).

6. The method of claim 4, wherein said byte codes are provided within the option bytes of said Transmission Control Protocol (TCP).

7. The method of claim 4, wherein:
said byte codes comprise
an RDMA identifier;
an RDMA data offset value; and
an RDMA data length value; and
said memory is identified by said RDMA identifier; and wherein said RDMA data is written to said memory using said data offset value and said data length value.

8. The method of claim 4, wherein:
said byte codes comprise:
an RDMA identifier;
a buffer offset value;
a sequence start value; and
a sequence end value; and
said memory is identified by said RDMA identifier; and wherein said RDMA data is written to said memory starting at an address designated by said buffer offset value and said sequence start value.

9. A computer system for facilitating remote direct memory access (RDMA) in a data communications system, said computer system comprising a network interface, a memory, and a processor configured to:
receive a packet according to an intermediate protocol layer definition in said network interface, wherein said intermediate protocol layer definition provides for a plurality of RDMA byte codes in the packet header, and wherein the packet header comprises one or more RDMA byte codes; and
process said packet based in said processor at least in part on said RDMA byte codes, wherein said processor is connected to said network interface,
read said byte codes to identify an RDMA data payload within said packet in said processor; and
store said RDMA data payload in said memory without copying said RDMA payload.

10. The computer system of claim 9, wherein:
said byte codes comprise
an RDMA identifier;
an RDMA data offset value; and
an RDMA data length value; and
said memory is identified by said RDMA identifier; and wherein said RDMA data is written to said memory using said data offset value and said data length value.

11. The computer system of claim 9, wherein:
said byte codes comprise:
an RDMA identifier;
a buffer offset value;
a sequence start value; and
a sequence end value; and
said memory is identified by said RDMA identifier; and wherein said RDMA data is written to said memory starting at an address designated by said buffer offset value and said sequence start value.

12. A computer-readable storage medium, comprising computer instructions for:
receiving a packet according to an intermediate protocol layer definition, wherein said intermediate protocol layer definition provides for a plurality of RDMA byte codes in the packet header, and wherein the packet header comprises one or more RDMA byte codes; and
processing said packet based at least in part on said RDMA byte codes, said processing further comprising:
reading said byte codes to identify an RDMA data payload within said packet; and
storing said RDMA data payload in a memory without copying said RDMA payload.

13. The computer-readable storage medium of claim 12, wherein:
said byte codes comprise
an RDMA identifier;
an RDMA data offset value; and
an RDMA data length value; and
said memory is identified by said RDMA identifier; and wherein said RDMA data is written to said memory using said data offset value and said data length value.

14. The computer-readable storage medium of claim 12, wherein:
said byte codes comprise:
an RDMA identifier;
a buffer offset value;
a sequence start value; and
a sequence end value; and said memory is identified by said RDMA identifier; and wherein said RDMA data is written to said memory starting at an address designated by said buffer offset value and said sequence start value.

15. A computer data signal embodied in a carrier wave, comprising computer instructions for:
- receiving a packet according to an intermediate protocol layer definition, wherein said intermediate protocol layer definition provides for a plurality of RDMA byte codes in the packet header, and wherein the packet header comprises one or more RDMA byte codes; and
- processing said packet based at least in part on said RDMA byte codes, said processing further comprising:
  - reading said byte codes to identify an RDMA data payload within said packet; and
  - storing said RDMA data payload in a memory without copying said RDMA payload.

16. The computer data signal of claim 15, wherein:
said byte codes comprise
- an RDMA identifier;
- an RDMA data offset value; and
- an RDMA data length value; and said memory is identified by said RDMA identifier; and wherein said RDMA data is written to said memory using said data offset value and said data length value.

17. The computer data signal of claim 15, wherein:
said byte codes comprise:
- an RDMA identifier;
- a buffer offset value;
- a sequence start value; and
- a sequence end value; and said memory is identified by said RDMA identifier; and wherein said RDMA data is written to said memory starting at an address designated by said buffer offset value and said sequence start value.

18. A computer system for facilitating remote direct memory access (RDMA) in a data communications system, said computer system:
- means for receiving a packet according to an intermediate protocol layer definition, wherein said intermediate protocol layer definition provides for a plurality of RDMA byte codes in the packet header, and wherein the packet header comprises one or more RDMA byte codes; and
- means for processing said packet based at least in part on said RDMA byte codes, said means for processing further comprising:
  - means for reading said byte codes to identify an RDMA data payload within said packet; and
  - means for storing said RDMA data payload in a memory without copying said RDMA payload.

19. The computer system of claim 18, wherein:
said byte codes comprise
- an RDMA identifier;
- an RDMA data offset value; and
- an RDMA data length value; and said memory is identified by said RDMA identifier; and wherein said RDMA data is written to said memory using said data offset value and said data length value.

20. The computer system of claim 18, wherein:
said byte codes comprise:
- an RDMA identifier;
- a buffer offset value;
- a sequence start value; and
- a sequence end value; and said memory is identified by said RDMA identifier; and wherein said RDMA data is written to said memory starting at an address designated by said buffer offset value and said sequence start value.

* * * * *